United States Patent [19]

Hochstein et al.

[11] Patent Number: 4,712,433
[45] Date of Patent: Dec. 15, 1987

[54] TORQUE SENSOR FOR AUTOMOTIVE POWER STEERING SYSTEMS

[75] Inventors: Peter Hochstein, Troy; Nobuyuki Imai, Farmington Hills, both of Mich.

[73] Assignee: Aisin Seiki Kabushiki Kaisha, Aichi, Japan

[21] Appl. No.: 789,109

[22] Filed: Oct. 18, 1985

[51] Int. Cl.⁴ .................................................. G01L 3/10
[52] U.S. Cl. ............................ 73/862.36; 73/862.33; 324/209
[58] Field of Search ........... 73/862.33, 862.34, 862.36, 73/DIG. 2, 779; 324/209

[56] References Cited

U.S. PATENT DOCUMENTS

| | | |
|---|---|---|
| 1,354,698 | 10/1920 | Shallcross ........................ 73/862.33 |
| 3,329,012 | 7/1967 | Demuth ............................ 73/862.33 |
| 3,580,352 | 5/1971 | Hestad .......................... 73/862.33 X |
| 4,356,732 | 11/1982 | Hachtel et al. . |
| 4,414,855 | 11/1983 | Iwasaki . |
| 4,432,245 | 2/1984 | Hattori et al. ............... 73/862.34 X |
| 4,485,682 | 12/1984 | Stroezel et al. . |
| 4,506,554 | 3/1985 | Blomkvist et al. . |

FOREIGN PATENT DOCUMENTS

| | | |
|---|---|---|
| 667836 | 6/1979 | U.S.S.R. . |
| 0717574 | 2/1980 | U.S.S.R. ........................... 73/862.34 |
| 838448 | 6/1981 | U.S.S.R. . |

OTHER PUBLICATIONS

Artamonov et al, "Converter of the Torsion Angle . . . Digital Code", Izmeritelnaya Tekhnika, No. 7, pp. 33–35, Jul. 1978.

Primary Examiner—Charles A. Ruehl
Attorney, Agent, or Firm—Banner, Birch, McKie & Beckett

[57] ABSTRACT

A non-contacting, inductively coupled leakage flux torque sensor particularly adapted for automobile power steering systems. The input and output shafts of the system are coupled by a lost motion mechanism. Discontinuities are formed in a ferromagnetic member. The discontinuities may comprise sets of slots or ferromagnetic projections on facing end surfaces of the ferromagnetic member. As a result of torsional stress on the member, the discontinuities change shape and dimension or are displaced, resulting in a change in leakage flux. The change in leakage flux is detected by two differentially connected coils. A modulator-demodulator circuit provides a determination of torque as a function of the changed flux.

13 Claims, 18 Drawing Figures

TORQUE SENSOR FOR AUTOMOTIVE POWER STEERING SYSTEMS

BACKGROUND OF THE INVENTION

The present invention relates to an apparatus for measuring torque in rotating shafts. The apparatus provides high sensitivity to torsional changes yet is sufficiently strong to withstand high input forces. Particularly, the invention is a non-contacting, inductively coupled, apparatus for sensing torque induced leakage flux changes in a rotating ferromagnetic rod or shaft, in which a lost motion spline provides good resolution and linearity to low input forces, yet also enables the torque sensor to withstand high input torque. The invention has particular application in the measurement of torque in a power steering system of an automotive vehicle.

Automobile power steering systems have traditionally used hydraulic servo-valves and hydraulic pumps to provide drivers with the necessary power assistance for steering. Most of the systems have evolved into mechanisms which use force feedback means to provide steering "feel". One major disadvantage of hydraulic power steering devices is the need to maintain hydraulic fluid, such as oil, at high pressures. The necessary fluid pressure generally is supplied by an engine driven pump. The parasitic loss in such a pump is relatively high so that even at times of zero power assist, the pump still draws power from the engine. Such parasitic losses are becoming more important as engine sizes decline while concern for efficiency continues.

The present invention replaces the prior art hydraulic system with an electric power steering system. However, such a system suitable for measuring steering wheel input torque requires a torque sensor having both high sensitivity to small input forces and sufficient strength to withstand large input forces on the order of 100 ft.-lbs.

Several different types of torque sensors are well-known. However, these known systems are not suitable for an automotive power steering system. In the field of mechanical instrumentation, the measurement of torque in rotating shafts has always been difficult. Torque is either measured indirectly, as a function of power and speed, or measured directly. Large machines, operating at relatively high torques, and very small machines, operating at relatively low torques, preclude the use of indirect torque sensing means, thus requiring a direct measurement technique. In other areas as well, direct measurement is preferred. However, direct measurement of torsion in rotating shafts can only be accomplished by measuring the actual strain in the shaft or by measuring the reaction torque (moment) with respect to a stable reference platform, which is difficult in certain situations.

Conventional methods for the direct measurement of shaft torsion can generally be grouped into two categories: contacting and non-contacting.

Contacting methods of measuring torque, such as the application of strain gages to the strained member, are common. However, traditional strain gage torque sensors, with either rotating brushes or rotating transformers, are far too expensive for automobile use, and are probably not reliable enough over the environmental extremes encountered in normal usage. Moreover, strain gages function best when used in conjunction with stationary members. When applied to a rotating shaft, wires connecting the gages must be run through slip rings to the source of excitation, detection and amplification. Slip rings are notoriously noisy (electrically), subject to wear, and expensive to apply. Transformer coupled strain gage torque sensors are also known. However, the complexity and high cost of such rotary transformer instruments relegates their application to laboratory or test-stand environments. They are not suitable to an automotive power steering system. Umbilical connection to a shaft mounted strain gage may be used in power steering applications since rotation is not continuous but most often limited to less than four turns lock to lock. The longevity of such coil/uncoil connections is suspect, however, particularly when the requirement of automotive safety and reliability are considered.

A common non-contacting method of measuring torque generally involves measurement of magnetic properties. The change of magnetic properties of various alloys as a result of an induced stress is well-known. In particular, the permeability of a magnetic material tends to increase due to tensile stress and tends to decrease due to compressive stress. This effect has been utilized in some torque transducers. For example, in commonly assigned U.S. Pat. No. 4,414,855 the change in permeability of a magnetic layer on the surface of a non-magnetic cylindrical rod is sensed by one or more pick-up coils located adjacent to a stressed rotating rod. For a given pick-up coil, the inductance of the coil is directly proportional to the permeability of the magnetic layer. Since the permeability of the magnetic layer is directly proportional to the stress applied thereto, the inductance of the pick-up coils is directly proportional to the stress applied to the magnetic layer. Thus the stress applied to the cylindrical rod including the magnetic layer thereon may be determined by detecting the inductance of the pick-up coils. However, temperature dependence of these same magnetic properties restricts the usefulness of such non-contacting sensors. Fabrication of power transmitting shafts using such alloys also presents many difficulties.

When a metallic member is magnetized, a leakage flux is generated at any point where a discontinuity, flaw, or defect in the material exists. The quantity of leakage flux, and therefore the sensitivity of sensing devices to the defect, is dependent upon the relative orientation of the defect and the field. The present invention uses such leakage flux principles and is based upon the well known technique of eddy current testing, wherein discontinuities, cracks, inclusions or other defects in metallic objects are detected by means of changes in the flux due to induced current flow. Eddy current testing is primarily used as a sorting method or as a quality assurance tool.

Specifically, eddy currents are typically generated within an object to be inspected by induction from an adjacent coil establishing an alternating excitation current. The eddy currents then generate magnetic fields which couple to the coil at the same frequency as that of the excitation current, but which may be of a different phase. The phase and amplitude of the induced voltages depend upon the structural characteristics of the object under test. The phase relationships may be measured by appropriate signal processing circuits.

The flow of eddy currents in a test object is governed by the skin effect phenomenon. The currents decrease exponentially with depth, depending on the shape of the object, its thickness, and its electromagnetic properties.

In addition to the decrease of current amplitude as depth below the surface increases, the phase angle of the current increasingly lags the excitation signal. While eddy current testing has been used in the prior art, the present invention, however, applies the eddy current testing concept in a novel manner for achieving a more useful, more reliable, more sensitive noncontacting leakage flux torque sensor which is particularly applicable to automobile power steering systems.

Another important limitation of prior art torque sensing devices which measure stress-induced material property variations in a rotating shaft, is the insensitivity of torque direction. Whether the torsional member is stressed clockwise or counterclockwise, the net induced material property change will be identical—at least in a perfectly elastic system. For many applications, such as automotive steering effort sensors, the sign (direction) of the applied torque is essential information.

In general, all electromagnetic torque transducers which rely upon reluctance or leakage flux change actually measure stress induced strain or displacement. If these displacements are relatively large for a given input stress, the transducer will be relatively sensitive. However, compliant transducers with high sensitivity are not capable of sustaining high stress safely. In order to withstand the high input torque that may be applied to a steering wheel, the transducer would have to be stiff and insensitive. One major disadvantage of prior known noncontacting leakage flux torque sensors and variable reluctance transducers is that they do not have the requisite combination of sensitivity and strength to function effectively in an automotive power steering system. Typical full scale torque input to steering wheels is on the order of ±70 in.-lbs. for full power assist. However, current automotive design standards require that the steering input shaft must be sufficiently strong to withstand a force of at least 100 ft.-lbs., because of the potential for power steering system failure or possible driver induced overload.

In current hydraulic servo-assisted power steering systems a compliant torsion bar is placed in series with the steering input shaft. This torsion bar is designed to deflect ±7° for a +70 in.-lbs. torque. At higher torques, a lost motion spline arrests the excessive compliance, and permits direct drive from the steering input shaft to the steering gear box. This added torsional compliance has been introduced to provide optimal "feel" and feedback to the driver, and does much to make current power steering systems responsive and driveable.

SUMMARY OF THE INVENTION

The invention described and claimed herein is a noncontacting, inductively coupled, leakage flux torque sensor for an electrical servo assisted power steering system wherein the motive power is supplied by small, highly geared, bidirectional d.c. servo motors. Such torque motors are generally driven by high current servo-amplifiers and only draw current when providing steering assistance. No energy is dissipated when the steering input torque is zero, such as when driving in a straight path. Input commands to the servo system are derived from a noncontacting leakage flux steering torque sensor mounted to the steering wheel shaft. Driver induced torque to the steering wheel shaft is sensed electronically, amplified and translated into a power assist signal which then powers the electric torque motor. By measuring the deformation of the compliant torsion bar with a leakage flux sensor and by limiting the angle through which the input shaft may twist the measuring element, such as by a lost motion device, both high sensitivity and high torque capability are realized.

The torque sensor of the present invention is far simpler, more useful, more sensitive, lower in cost, stronger and more reliable than prior known torque sensors. It has an output which is linear with applied torque by a change in operating quadrant (sign). The invention has particular applicability in determining torque on, for example, a power steering or drive shaft of an automobile, although other applications are of course within the scope of the invention.

The torque sensor of the present invention includes a primary coil for establishing an induced excitation current in a torsionally stressed ferromagnetic member preferably comprising discontinuities, such as a slot or groove. Alternatively, the discontinuities may comprise a split sleeve having ferromagnetic projections. This thereby generates a magnetic leakage flux at the discontinuities or projections. The torque sensor further comprises two differentially connected secondary coils for measuring the change in leakage flux at the discontinuities. The output of the secondary coils is provided to a circuit for deriving phase and amplitude information from the differentially connected sensing coils, thus allowing torque to be determined as a function of the output voltage of the secondary coils. A lost motion device is provided to limit the torsional compliance of the torque sensor and maintain the high torque capability of the system in which it is used.

DETAILED DESCRIPTION OF THE INVENTION

Figure 1:
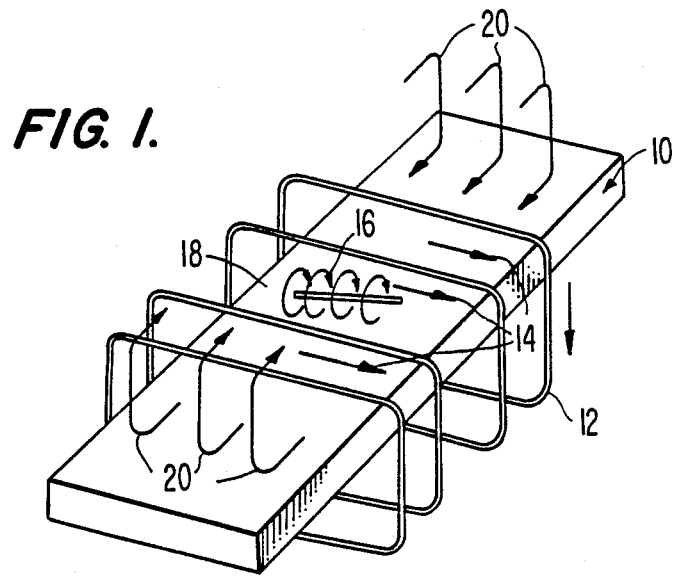
FIG. 1 is a schematic illustration of leakage flux generation at a surface discontinuity in a ferromagnetic member.

As shown schematically in FIG. 1, when a ferromagnetic member 10 is placed within an axial solenoid coil 12 establishing an excitation current, eddy currents, shown generally by arrows 14, are generated within member 10. A discontinuity, flaw, or defect in the surface is represented at 16. When such discontinuities occur within the skin depth of the ferromagnetic member, the leakage flux at the discontinuity, shown generally at arrows 18, is higher than the induced flux, shown generally by arrows 20, at other parts of the contiguous surface, since the permeance of the discontinuity is several orders of magnitude lower than the permeance within the surface of the ferromagnetic material. The magnitude of the leakage flux 18, which couples to the coil at the same frequency as that of the excitation current, is a direct function of the size, number and depth of the surface discontinuity.

Figure 2A:
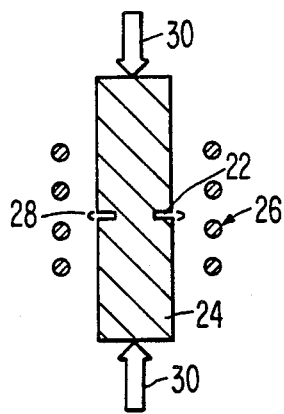
FIGS. 2A–C are a schematic illustration of the changes in shape and dimension of a surface discontinuity as the result of stress forces.
Figure 2B:
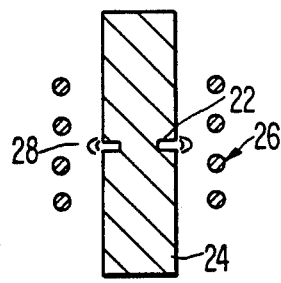
Figure 2C:
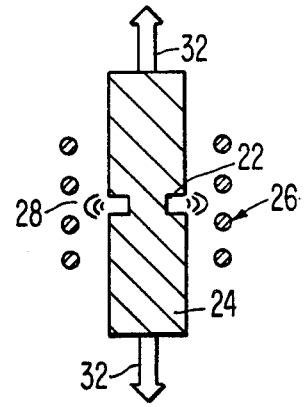

As a member is placed under a stress force, discontinuities in the surface will either shrink or expand. FIGS. 2a-c illustrate a circumferential slot or groove 22 inscribed in the surface of a cylindrical rod 24 orthogonal to the central axis of cylindrical rod 24. Cylindrical rod 24 is surrounded by an excitation coil, generally shown at 26. The leakage flux at the circumferential slot is schematically shown by flux lines 28. With no stress forces on rod 24, as shown in FIG. 2b, only nominal leakage flux is generated at groove 22. As shown in FIG. 2a, however, in the simple case where a compressive force 30 is applied to rod 24, the circumferential slot 22 is compressed and made smaller, thereby reducing the leakage flux at groove 22 from that of the unstressed state shown in FIG. 2b. Conversely, as shown in FIG. 2c, when a tensile force 32 is applied to cylindrical rod 24, circumferential groove 22 is increased in size, thereby increasing the leakage flux from that of the unstressed state shown in FIG. 2b. In this simplified example, groove dimension was the only factor considered as affecting leakage. In fact, however, other factors, such as resistivity and permeability of the ferromagnetic shaft, as well as the amplitude and frequency of the excitation field also affect the leakage flux. Still other factors which affect the leakage flux are temperature and mechanical or electronic instability.

Figure 3:
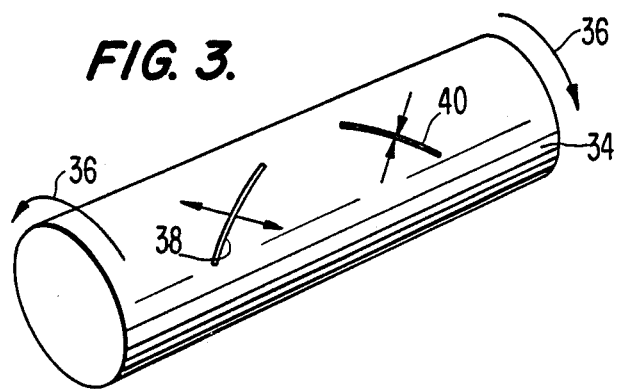
FIG. 3 is a perspective, schematic view of tensile and compressive forces acting on discontinuities on the surface of a ferromagnetic torsion shaft.

FIGS. 2 a-c illustrate the simple case of pure compressive or tensile stresses. In FIG. 3, a ferromagnetic torsion bar 34 is illustrated which is subject to a torsional stress, generally represented by arrows 36. Two identical surface discontinuities, such as slots or grooves 38 and 40, are shown at torsion bar 34. Slots 38 and 40 are placed at an angle with respect to the central axis of torsion bar 34. If slots 38 and 40 are parallel to the magnetic field generated, i.e., parallel to the axis of torsion bar 34, virtually no increase flux leakage is generated. Conversely, if slots 38 and 40 are made more orthogonal with respect to the axis of bar 34, improved sensitivity to flux changes results. Preferably, slots 38 and 40 are placed at an angle of 60°-75° with respect to the horizontal axis of the ferromagnetic member. Additionally, slots 38 and 40 are opposite in sense, that is mirror images of one another, so that one slot is reversed in orientation with respect to the central axis of bar 34 from the other slot. Although only a single slot 38 and a single slot 40 is shown in FIG. 3 for simplicity of illustration, ferromagnetic torsion bar 34 may preferably be provided with more than one slot, i.e., sets of parallel slots as each surface discontinuity.

As shown clearly in FIG. 3, as bar 34 is subjected to torsional stresses 36, slot 40 will tend to shrink or close, while slot 38 will tend to expand or open.

In an elastic, symmetrical system, the equal and opposite forces on the discontinuities shown in FIG. 3 may be conveniently measured by a differential measurement technique. A single primary coil preferably is used to establish an excitation field, while two differentially connected secondary coils preferably are used for sensing the change in leakage flux. In such a system, common mode effects, such as temperature induced material property changes, are effectively cancelled, while the strain sensitivity is doubled.

Figure 4A:
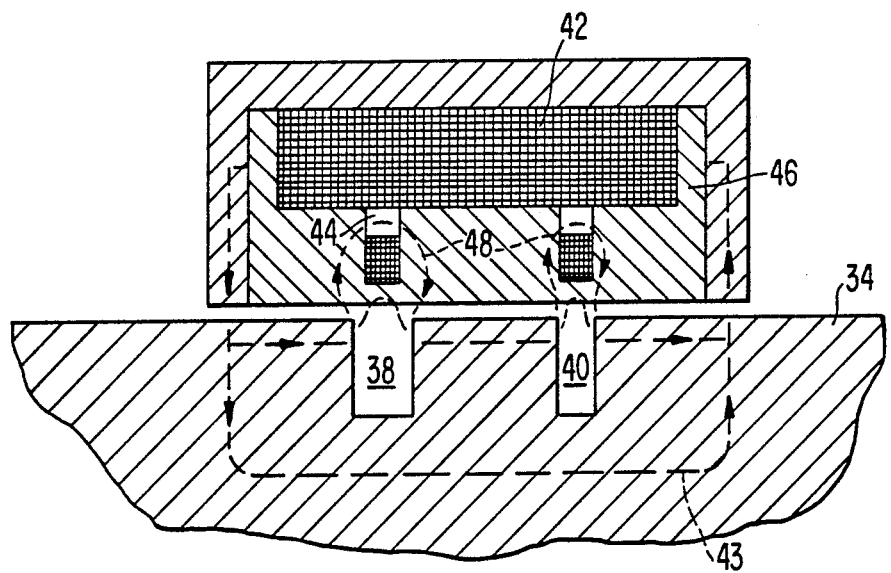
FIG. 4A is a cross-sectional view of the torsion shaft shown in FIG. 3 with the shaft surrounded by a primary excitation coil and two differentially connected secondary sensing coils.

In FIGS. 4A and B, ferromagnetic torsion bar 34 is shown surrounded by a single primary excitation coil 42 and two differentially connected sensing coils 44 and 46. Torque sensors of the type disclosed herein are extremely sensitive to extraneous magnetic fields. If the sensing coils 44 and 46 were not differentially connected, the system would not be operable because of extraneous magnetic fields. Primary coil 42 serves to create an induced flux, shown generally at 43. Differentially connected sensing coils 44 and 46 are located adjacent to slots 38 and 40, respectively. When a torsional stress is applied to bar 34, leakage flux 48 at slot 38 increases, whereas an equal decrease of leakage flux 48 occurs at slot 40. Since these changes are summed differentially by the differentially connected secondary coils 44 and 46, an effective strain equal to twice the actual strain can be measured.

The use of separate excitation and differential detection coils allows a relatively high level of electromagnetic excitation, and a high degree of sensitivity in leakage flux detection. Furthermore, the inherent common mode rejection characteristics of a balanced differential sensor pair permits intrinsic cancellation of deleterious influences such as stray magnetic fields, temperature effects and mechanically induced variations.

Figure 5:
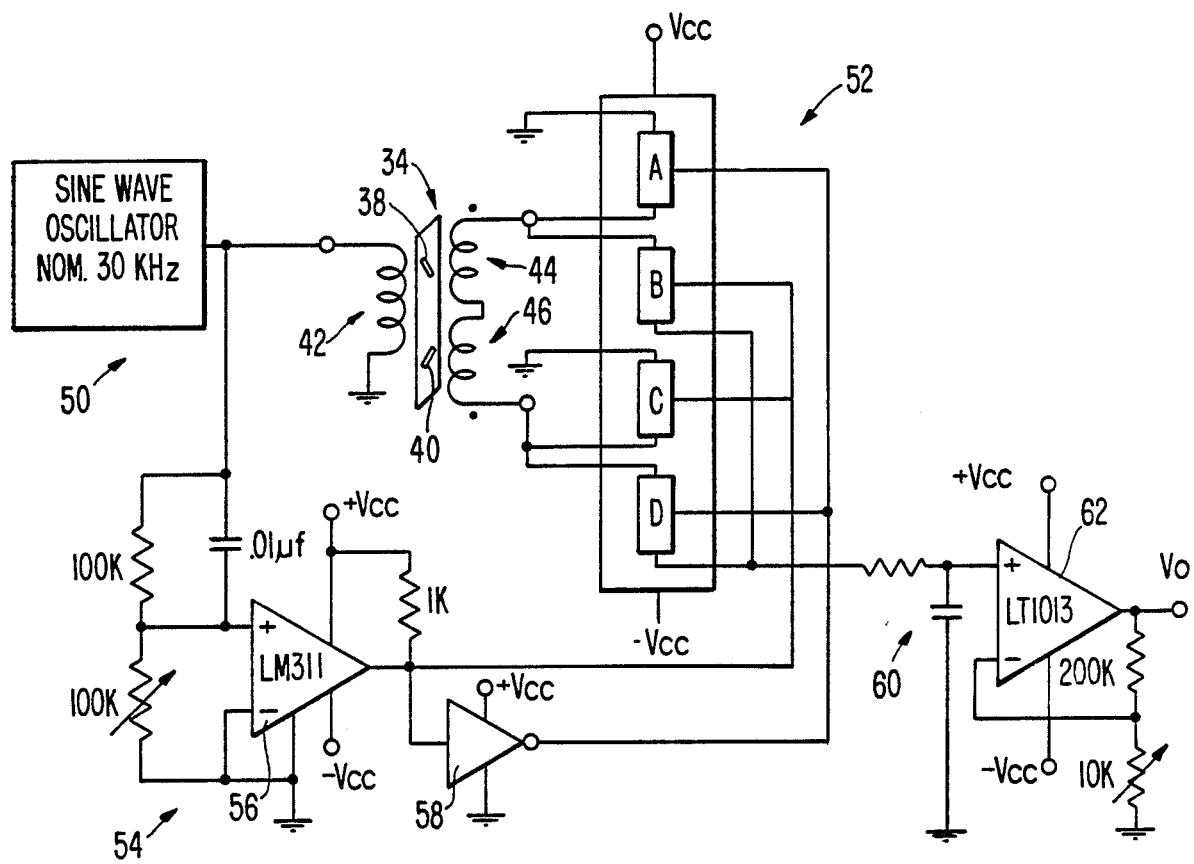
FIG. 5 is a circuit diagram of a circuit for deriving phase and amplitude information from the differentially connected sensing coils.

FIG. 5 shows a generally conventional circuit for determining the torque on bar 34, although any other circuit configuration for deriving phase and amplitude information from the differentially connected sensing coils may also be used. In FIG. 5 a sinewave oscillator 50 is connected to primary coil 42 and provides the excitation current to induce flux in bar 34. Secondary coils 44 and 46 are connected to a quad bilateral switch 52. A zero crossing detector 54 comprising operational amplifier 56 and logic inverter 58 connect sinewave oscillator 50 to switch 52. Amplifier 56 consists of a comparator having a zero reference. The output of switch 52 is filtered by integrating circuit 60. A second operatonal amplifier 62 amplifies the output of integrator 60. In operation, zero crossing detector 54 produces square wave positive pulses at output 7 of comparator 56 for positive excursions of the input sinewave, while the output 2 of inverter 58 produces positive pulses for negative excursions of the input sinewave. Positive pulses at 7 turn on switches B and C which complete the secondary circuit of coils 44 and 46 and produce an output current to integrator 60. Positive pulses at 2 turn on switches D and A which likewise complete the current of coils 44 and 46 and produce an output current to integrator 60.

Figure 6:
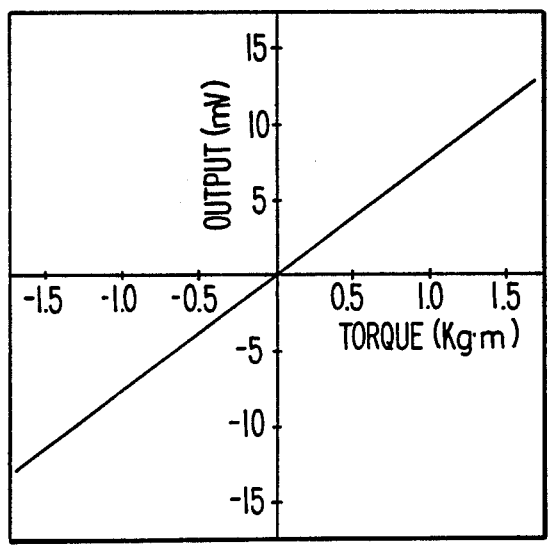
FIG. 6 is a graph of the output signal of the sensing coils plotted against torque.

The invention is applied to a specific example as follows. A cylindrical torsion bar of tool steel with an outside diameter of 12.7 mm was equipped with two sets of slots 45° to the central axis of the rod. Although the specific example tested used a 45° angle, it is preferred to use an angle between 60°-75° to maximize torsional strength and sensitivity to leakage flux. Each set of slots consisted of four grooves, each 12 mm long by 0.10 mm wide by 1.0 mm deep cut into the surface by electrical discharge machining. Although it is possible to use milled or etched slots, such techniques cannot achieve the small slot dimensions necessary for the desired sensitivity. Accordingly, electrical discharge machining is the preferred technique for making the slots. Additionally, the depth of the slots should be at least 4-5 times as great as the slot widths for effective sensitivity. Utilizing the circuit shown in FIG. 5, the data shown in FIG. 6 was obtained. In FIG. 6, the output voltage represents the output of integrator circuit 60; this output signal is linear with respect to the applied torque. Any circuit of either bridge or differential configuration which can extract amplitude and phase information from the sensing coils may be used, however, rather than the circuit shown in FIG. 5.

The 12.7 mm diameter torque shaft utilized in the example is capable of sustaining a torque in excess of 15 kilogram-meters for an internal maximum stress of approximately 700 kilograms per square meter. Such a shaft would have particular applicability in automotive power steering applications.

The sensitivity of the torque sensor of the present invention may be increased significantly by using a hollow, tubular sleeve, or torque sensing tube, as described more fully below in connection with FIG. 7A. With such a sleeve, the significant increase in strength sensitivity is offset only marginally by increasing internal stress. Additionally, sensitivity may be increased by changes in slot angle. By moving the slot angle towards a more orthogonal orientation to the bar axis than the 45° angle described above, sensitivity of the torque sensor improves with only slight compromises in fatigue life. Decreasing slot widths also increases strain sensitivity, as the physical decrease in slot width for a given induced strain shows a greater percentage change than for narrower slots. However, the cost and difficulty of producing slots of less than 100 microns-width must be considered. Sensitivity may also be increased by increasing the number of slots around the circumferences of the torque sensing bar.

Figure 4B:
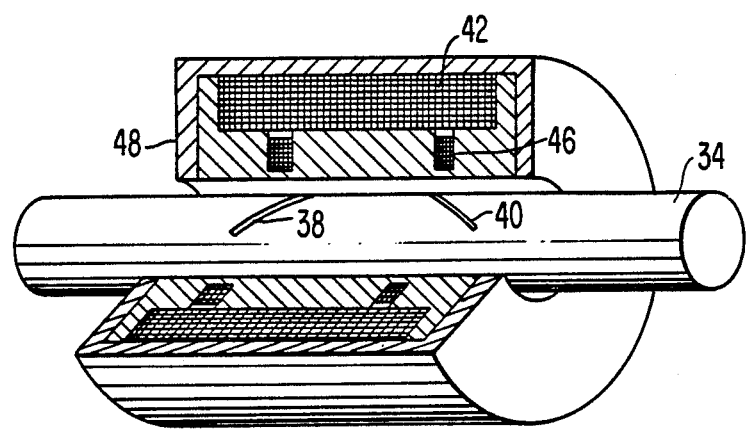
FIG. 4B is a perspective view of the arrangement shown in FIG. 4A.
Figure 7A:
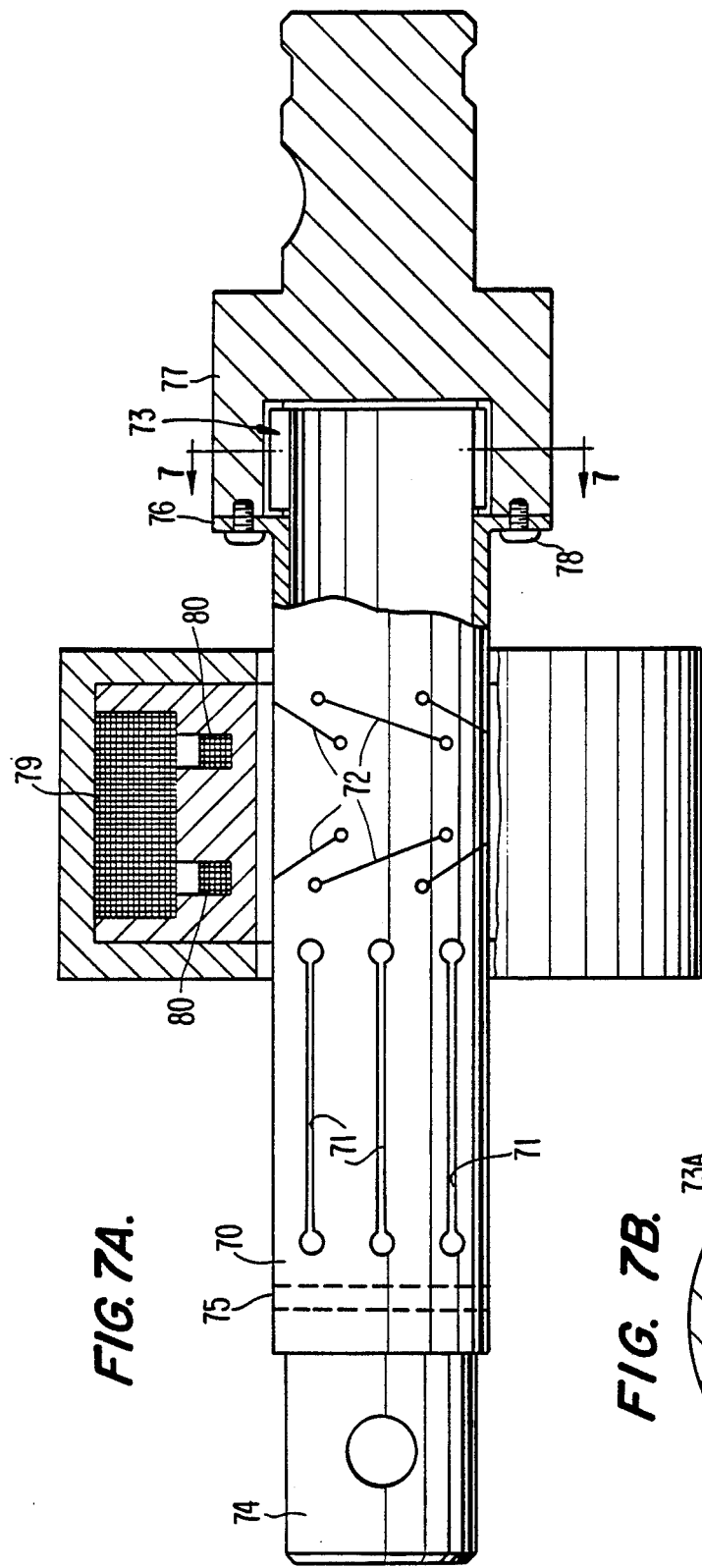
FIG. 7A is a cross-sectional view of a sleeve-type torque sensor according to the present invention.

As shown in FIG. 7A, the torque sensor of the present invention may comprise a hollow, tubular sleeve or torque sensing tube 70. A plurality of slots 72 are cut, preferably by electrical discharge machining, through the sleeve. Cutting slots 72 through sleeve 70 is preferred since, when a solid rod is used as a torque sensing element, as shown in FIGS. 4A and 4B, high stress concentrations result where the slots end, i.e., at the bottom surface of the slots. Moreover, there is no torque sensing advantage to the material remaining in the slot when a solid rod is used. A sensing coil, comprising an exciting coil 79 and two differentially connected pick-up coils 80, is provided to detect torque, as explained above.

Figure 7B:
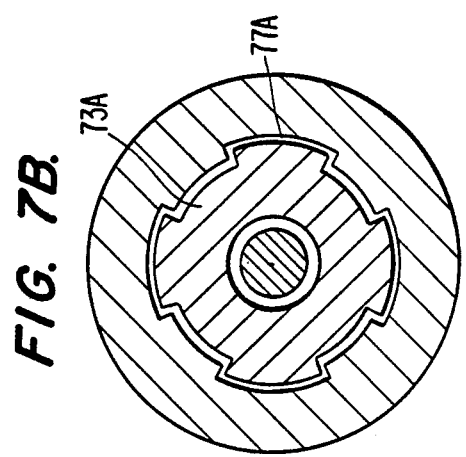
FIG. 7B is a cross-sectional view along line 7—7 of FIG. 7A.

As shown in Figure 7A, sleeve 70 is fixed about an input shaft 74 by a pin 75. Of course other forms of connection may also be used. In the particular form of the invention shown, sleeve 70 may be formed with a flange 76 which is fixed to an output shaft 77 by screws 78 or a similar connection. Input shaft 74 has a splined lost motion device 73 fixed to the output end of input shaft 74. Lost motion device 73 may comprise a spline, or a plurality of radially projecting tabs 73A which fit within a complementary cavity 77A of output shaft 77. As shown clearly in FIG. 7B, tabs 73A are spaced from the side walls of cavity 77A so that input shaft 74 will be able to rotate ±7° of angular motion before torque from input shaft 74 is coupled to output shaft 77 by the lost motion device 73. Thus, at normal torque inputs of nominally ±70 in. lbs., indicating maximum power assist, sleeve 70 will deflect ±7 degrees and torque is transferred from input shaft 74 through sleeve 70 to output shaft 77. At higher torques, lost motion device 73 prevents further deflection of sleeve 70 and shunts additional torque directly from input shaft 74 to output shaft 77, thus permitting the torque sensor to better withstand excessive torque loads.

Slots 71 may be provided in sleeve 70 to torsionally weaken the sleeve. Slots 71 may be formed so as to provide a desired torsional compliance for virtually any useful sleeve diameter and wall thickness. Slots 71 merely permit sleeve 70 to wind up ±7° before lost motion mechanism 73 comes into effect. Since slots 71 are parallel to the axis of shaft 74, they do not affect the leakage flux.

Slots 72 are preferably oriented at approximately 60°-75° with respect to the horizontal axis of sleeve 70. If slots 72 were at 0°, i.e., aligned with the horizontal axis, there would be no sensitivity to a change in leakage flux. Maximum sensitivity occurs when the slots are perpendicular to the horizontal axis. However, a perpendicular slot would result in destruction of tube 70 by cutting it into two distinct sections. The preferred 60°-75° angle, or aspect ratio, of the slots provides maximum tube strength and maximum leakage flux sensitivity.

In a specific example of the embodiment shown in FIG. 7A, tube 70 has walls with a thickness of approximately 0.5 mm. The wall thickness could vary from approximately 0.2 mm to several millimeters. However, if the tube is too thin, its strength decreases to the point where it is too fragile to be practically usable. Slots 72 are cut through the tube wall and have a width of approximately 0.1 mm and a length of approximately 5-12 mm. Sensitivity to leakage flux will be increased if the slots are narrower.

Figure 9A:
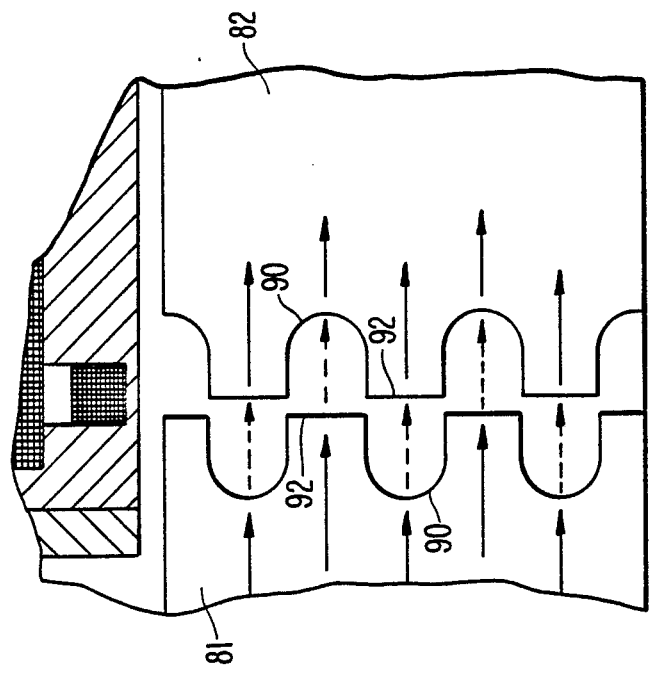
FIG. 9A is a partial side view of the torque sensor shown in FIG. 8A with the sleeve segments displaced by a torque.
Figure 9B:
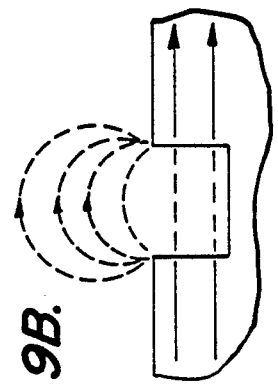
FIG. 9B is a schematic illustration of the leakage flux from the sleeves shown in FIG. 9A.
Figure 10:
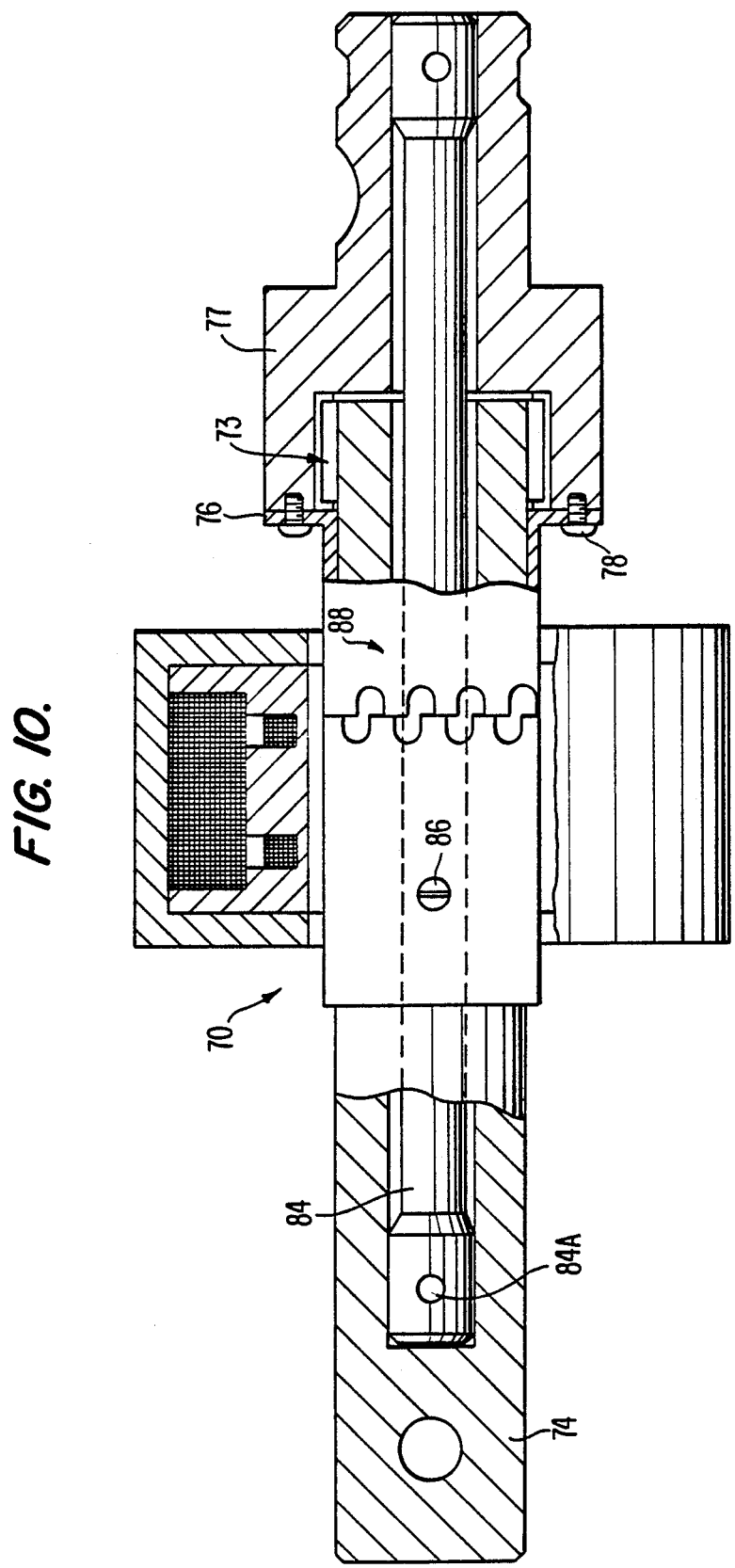
FIG. 10 is a cross-sectional view of a torque sensor device using a split sleeve, as shown in FIGS. 7 and 8, and including a primary excitation coil and two differentially connected secondary sensing coils.

As shown in FIGS. 8A-10, the torque sensing sleeve 70 may be formed in two discreet sections 81, 82. A torsion carrying bar 84 passes through the sleeves, as shown in FIG. 10. Torsion bar 84 is fixed by a pin 84A to an input shaft 74. A lost motion connection, shown generally at 73, such as the splined connection described above, connects input shaft 74 to output shaft 77. Sleeve sections 81, 82 are connected to torsion bar 84 by pin 86 or a similar connection. A sensing coil, comprising an exciting coil and differentially connected pick-up coils, is provided, as previously described. Each sleeve section 81, 82 includes a somewhat scalloped end surface 88, i.e., an end surface comprising a series of inwardly curved, concave segments 90 separated by projecting segments 92. Other irregularly shaped, end surfaces may also be used. In the embodiment of FIGS.

8A-10, the change in leakage flux is measured as a result of the displacement of adjacent ferromagnetic projections 92 rather than the displacement of slots in the sleeve as described above.

Figure 8A:
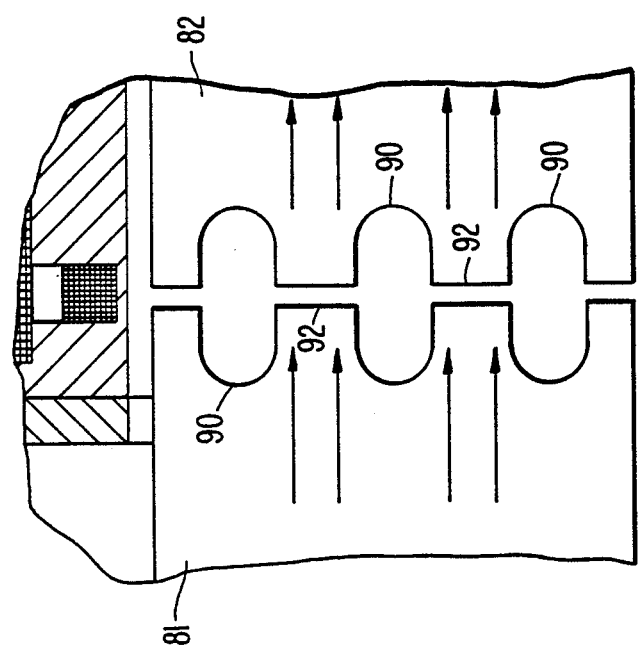
FIG. 8A is a partial side view of a torque sensor comprising a split sleeve having ferromagnetic projections, with the torque sensor in a neutral position.
Figure 8B:
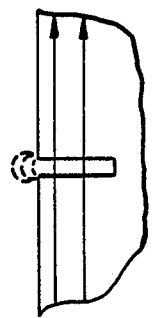
FIG. 8B is a schematic illustration of the leakage flux from the sleeves shown in FIG. 8A.

Shown in FIG. 8A with a flux leakage as depicted in FIG. 8B, the torque sensor is in a nominally 50% coupled, neutral state. Projections 92 are either decoupled or further coupled by an input torque to yield a corresponding increase or decrease in the leakage flux resulting from the gap between the split sleeves. As shown in FIG. 9A, projections 92 are further coupled to increase the leakage flux, as depicted in FIG. 9B.

Figure 11:
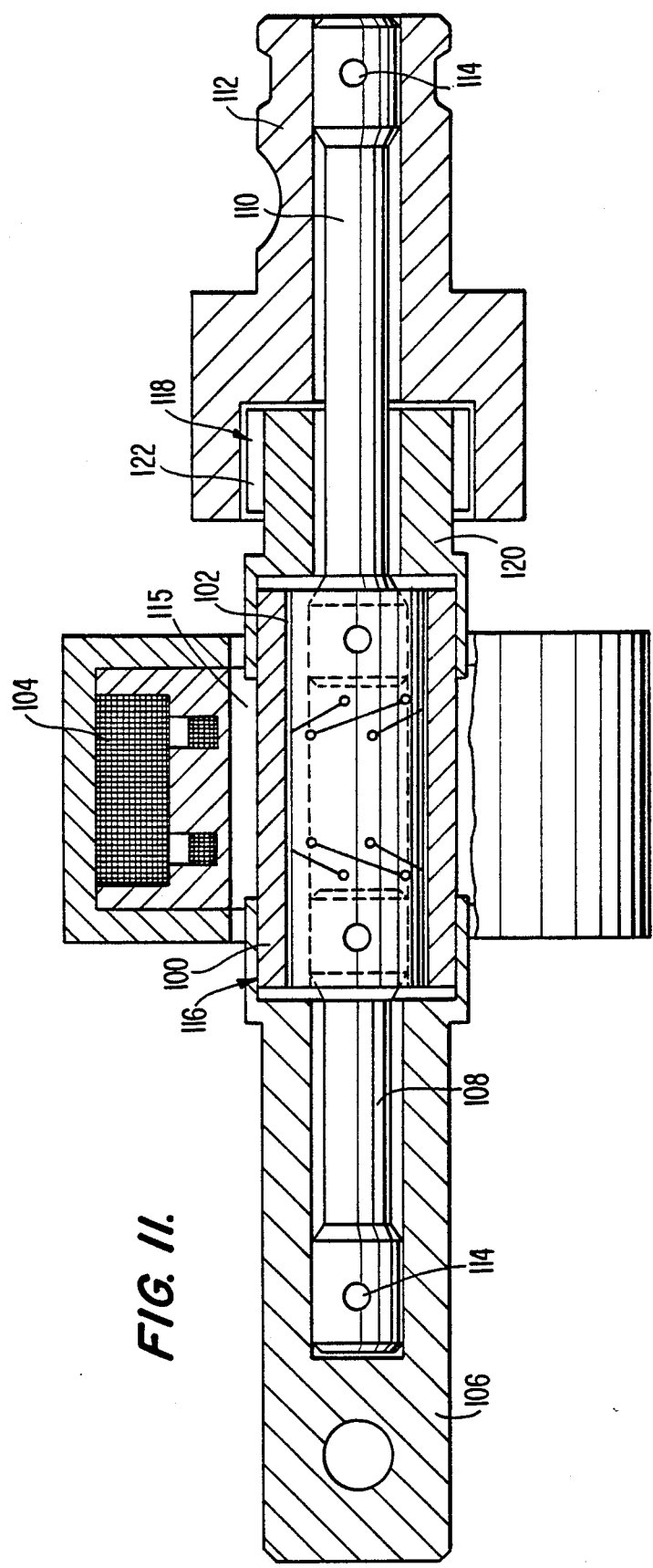
FIG. 11 is a cross-sectional view of another embodiment of the invention.

An alternative arrangement is provided in FIG. 11. In this embodiment, the invention incorporates an electromagneticaly transparent sleeve 100 as the main stress carrying element. This tubular member serves two purposes: as a torsionally stiff, high strength material it provides the high torque capability of the transducer, and as an electromagnetically transparent device, it allows inductive coupling to a torque sensing tube 102 from exciting coil 104 and to the differential pick-up coils 104.

An input steering torque, applied to an input, shaft 106 is transmitted through input torsion bar 108, torque sensing tube 102, output torsion bar 110 and output shaft 112. Torsion bars 108, 110 may be conveniently coupled to the input and output shafts 106, 112, respectively, by means of pins, such as shown in 114. The sleeve 100 also may be connected to input shaft 106 by means of adhesives or staking, as shown generally at 116. A splined lost motion mechanism 118, as previously described, will not couple torque until ±7° of angular motion between input spline 120 fixed to sleeve 100 and output splines 122 of output shaft 112 is induced. Input spline 120 is preferably formed as a separate member stacked or adhesively connected to the outside surface of sleeve 100. Input spline 120 preferably is axially spaced from input shaft 106, thus leaving a clear space 115 between the outer surface of sleeve 100 and the differential sensing coils. The torsional compliance is sustained by the torsion bars 108, 110 in series with the torque sensing tube 102.

In order to maximize the electronic sensitivity of the torque sensing transducer position, the electromagnetic coupling (between the exciting coils, differential sensing coils, and the electromagnetic sensing tube itself) must be high. In practical terms the coil inside diameters must be relatively closely spaced from the torque sensing tube, thereby limiting the available wall thickness for interposed main stress sleeve 100. This sleeve may conveniently be made of high performance nonconducting composite. Sleeve 100 must have a mean diameter consistent with the maximum allowable cyclical stress limitations for the composite material. In practice, a nominal 0.70 inch O.D. glass (80%)-epoxy composite tube with a wall thickness of nominally 0.13 inch would require a torque sensing tube of nominally 0.43 inch diameter. Such a tube would not exhibit the required ±7° of compliance for input torques of ±70 in.-lbs. Torsionally compliant torsion bars of relatively small diameter may be used to provide the necessary angular deflection, or modifications to the torque sensing tube itself such as horizontal slits shown in FIG. 7A may be employed.

Figure 12:
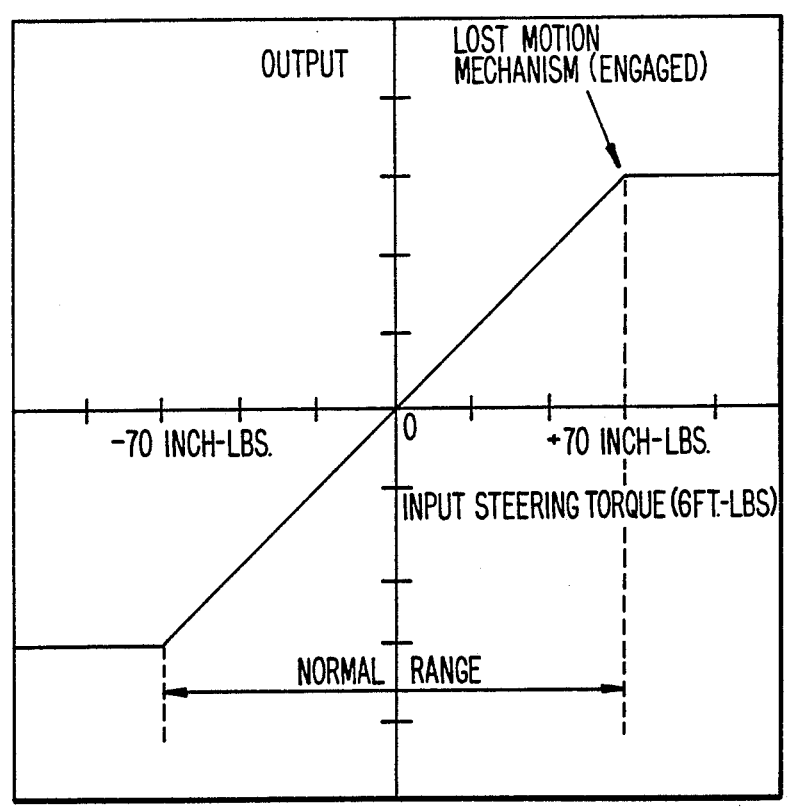
FIG. 12 is a graph of a typical output response curve of the present invention.

A typical output response curve for a lost motion torque sensor according to the present invention is shown in FIG. 12. It can be seen that the torque transducer is only required to perform linearly over a limited range of bidirectional torque. The transducers' ability to sustain potentially damaging overloads is assured by the use of the lost motion stress decoupling mechanism.

Although the invention has been described with respect to a preferred embodiment, it will be obvious to those of ordinary skill that numerour changes and modifications are possible, and the invention is defined and limited only by the following claims.

We claim:

1. A noncontacting, leakage flux torque sensor for an automotive, electrically powered steering assist system comprising:

an input shaft;

an output shaft;

a ferromagnetic member fixed to both said input shaft and said output shaft so as to transfer torque to said output shaft from said input shaft, said ferromagnetic member having at least one discontinuity;

a lost motion connection means for directly coupling said input shaft to said output shaft so that said input shaft may rotate a predetermined distance with respect to said output shaft before said lost motion connection means engages said output shaft, said lost motion connection means, when engaged, coupling said input and output shafts and thereby shunting additional torque directly from said input shaft to said output shaft;

a primary coil for establishing an induced excitation current in said ferromagnetic member thereby generating a magnetic leakage flux at said discontinuity;

two differentially connected secondary coils for measuring the change in leakage flux at said discontinuity when a torsional stress is applied to said ferromagnetic member to rotate said member less than said predetermined distance; and amplitude and phase means for deriving the amplitude and phase of the induced current output of said secondary coils.

2. A torque sensor as recited in claim 1 wherein said lost motion connection comprises a spline connection between said input and output shafts.

3. A torque sensor as recited in claim 2 wherein said spline connection comprises a plurality of radially projecting tabs on said input shaft and a plurality of tab receiving cavities in said output shaft, said tabs filling within said cavities so that in an unstessed condition the outer walls of said tabs are spaced from the inner walls of said cavities.

4. A torque sensor as recited in claim 1 wherein said ferromagnetic member comprises a torque sensing tube.

5. A torque sensor as recited in claim 4 wherein said tube comprises a plurality of torsion compliance slits parallel to the horizontal axis of said tube for weakening said tube and providing a desired amount of torsional compliance in said tube.

6. A torque sensor as recited in claim 5 wherein said tube comprises a tubular sleeve.

7. A torque sensor as recited in claim 4 wherein said discontinuity comprises at least two sets of slots, one set the mirrored image of the other, said slots formed completely through the wall of said tube.

8. A torque sensor as recited in claim 4 further comprising an electromagnetically transparent sleeve disposed between said torque sensing tube and said coils in the radial direction and connected to said lost motion connection means so that said sleeve shunts additional torque directly from said input shaft to said output shaft and allows inductive coupling of said coils and said torque sensing tube.

9. A torque sensor as recited in claim 4 further comprising a torsion bar for fixing said torque sensing tube to said input and output shafts.

10. A torque sensor as recited in claim 9 wherein said torsion bar comprises an input torsion bar fixed to said input shaft and an output torsion bar fixed to said output shaft.

11. A torque sensor as recited in claim 4 wherein said tube comprises a tubular sleeve.

12. A torque sensor as recited in claim 1 wherein said discontinuity comprises at least two sets of slots, one set the mirrored image of the other, said slots positioned at an angle of 60°–75° with respect to the central horizontal axis of said ferromagnetic member.

13. A torque sensor as recited in claim 12 wherein said slots each have a depth of at least 4 times greater than their width.

* * * * *